L. W. CHUBB.
ELECTRICAL TESTING DEVICE.
APPLICATION FILED FEB. 4, 1916.
1,253,211.
Patented Jan. 15, 1918.
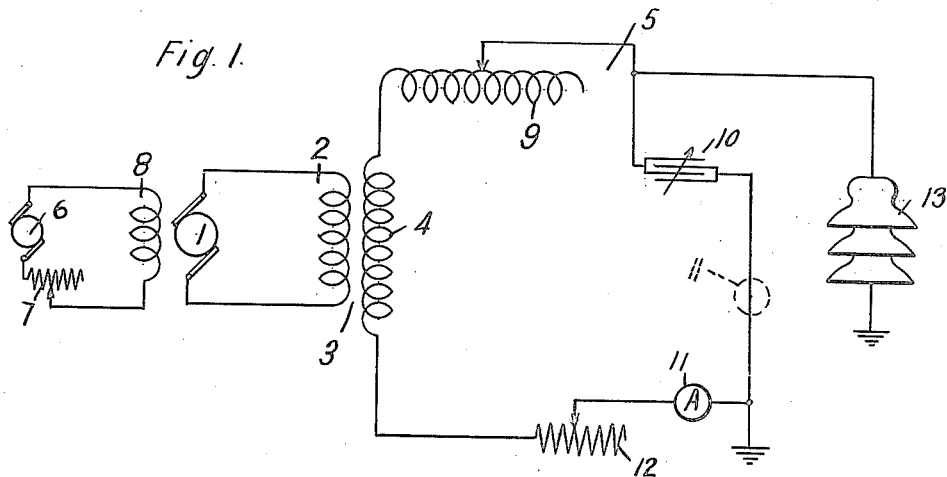
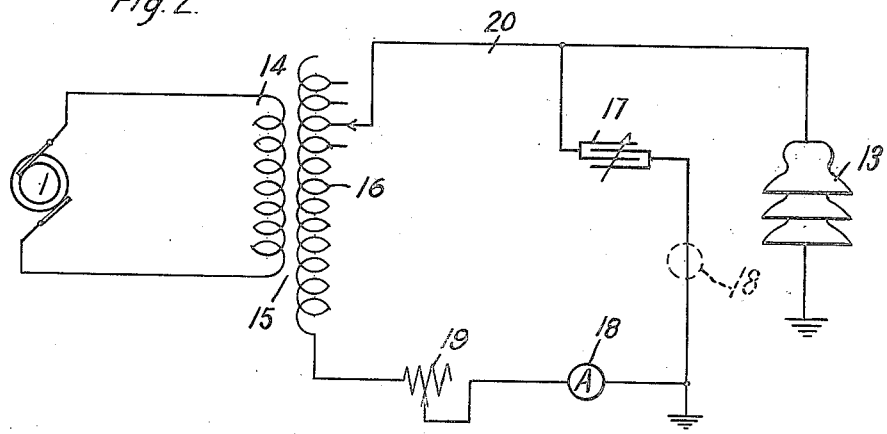
WITNESSES:
Fred H Miller
J H Procter
INVENTOR
Lewis W. Chubb
BY
Wesley G. Carr
ATTORNEY

UNITED STATES PATENT OFFICE.

LEWIS W. CHUBB, OF PITTSBURGH, PENNSYLVANIA, ASSIGNOR TO WESTINGHOUSE ELECTRIC AND MANUFACTURING COMPANY, A CORPORATION OF PENNSYLVANIA.

ELECTRICAL TESTING DEVICE.

1,253,211.      Specification of Letters Patent.      Patented Jan. 15, 1918.

Application filed February 4, 1916. Serial No. 76,159.

*To all whom it may concern:*

Be it known that I, LEWIS W. CHUBB, a citizen of the United States, and a resident of Pittsburgh, in the county of Allegheny and State of Pennsylvania, have invented a new and useful Improvement in Electrical Testing Devices, of which the following is a specification.

My invention relates to electrical-testing devices and particularly to means for, and methods of, testing insulators and other electrical apparatus.

One object of my invention is to provide means for, and a method of, so arranging an electric circuit that a relatively high voltage of substantially a sine-wave form may be obtained.

Another object of my invention is to so arrange the circuits that, when the electrical apparatus to be tested breaks down, the supplied voltage shall inherently decrease in value.

Heretofore, when insulators were tested, it was necessary to use transformers to supply the relatively high testing voltage. But the forms of the voltage waves of testing transformers and the surges likely to be set up by such transformers tended to produce inaccuracy in the results obtained. Also, when a fault occurred, the voltage sometimes rose to dangerously high values. In order to provide a device that produces a voltage wave of more nearly sine form and having an inherent property of reducing the voltage when a fault occurs, I provide a series resonant circuit, and I connect the device to be tested in parallel relation to a portion of the circuit thus constituted. The circuit is tuned to be resonant at the correct frequency, and a crest voltmeter, substantially the same as set forth in the U. S. patent application Serial No. 798,529, filed October 31, 1913, by C. Le G. Fortescue and assigned to the Westinghouse Electric and Manufacturing Company, or a properly calibrated ammeter may be used to determine the value of the testing voltage.

Figure 1 of the accompanying drawings is a diagrammatic view of an electrical circuit illustrating the use of my invention in the testing of an insulator, and Fig. 2 is a diagrammatic view of a modified form of electric circuit embodying my invention.

An alternating-current generator 1 is connected to the primary winding 2 of a transformer 3 the secondary winding 4 of which is connected in a series resonant circuit 5. A direct-current exciter generator is operatively connected, through a resistor 7, to the field winding 8 of the generator 1. The series resonant circuit 5 comprises the winding 4, a variable reactor 9, a variable condenser 10, an ammeter 11 and a variable resistor 12. One terminal of the ammeter 11 and one terminal of the condenser 10 are connected to the ground. One terminal of an insulator 13 that is to be tested is also connected to the ground and its other terminal is connected to the ungrounded terminal of the condenser 10. That is, the insulator 13 is connected in parallel relation to the condenser 10.

Relatively low voltage is generated by the generator 1, and the resistance of the resistor 12 is increased to limit the current to a safe value. The reactance of the reactor 9 or the capacitance of the condenser 10 is varied until the circuit 5 constitutes a series resonant circuit. The resistance of the resistor 12 is then decreased until the ammeter 11 indicates the testing voltage that is desired to be impressed across the insulator 13. When an ammeter is used, it must read a value proportional to the voltage, the capacitance of the condenser 10, assuming the capacitance of the insulator 13 to be negligible, and the frequency of the circuit, or, in other words, $$I = E \times C \times 2\pi f$$

where I equals the current as indicated by the ammeter 11, E is the test voltage desired, C is the capacitance of the condenser 10 and $f$ is the frequency of the circuit. However, if the capacitance of the insulator 13 is relatively high, C is the sum of the two capacitances.

In a series resonant circuit, the voltage impressed across the entire circuit is substantially zero, but the voltages across the condensive and reactive elements are 180° out of phase with each other and may be relatively high in value. Hence, if the insulator 13 is connected in parallel relation to one of the elements, a relatively high voltage may be impressed thereon. When the insulator 13 breaks down, the potential across the same will be decreased because the condition of resonance is destroyed.

In Fig. 2 of the drawings, an alternating-current generator 1 is operatively connected to the primary winding 14 of a transformer 15 having a variable secondary winding 16. The winding 16 is connected in series relation to a variable condenser 17, an ammeter 18 and a variable resistor 19. One terminal of the condenser 17 and one terminal of the ammeter 18 are connected to the ground. One terminal of the insulator 13 is also connected to the ground, and its other terminal is connected to the ungrounded terminal of the condenser 17.

The series resonant circuit 20 comprises the winding 16, the condenser 17 and the resistor 19, and the inductive element of the circuit is obtained by the leakage between the windings 14 and 16. However, in other respects, the arrangement shown in Fig. 2 is similar to that shown in Fig. 1.

Properly calibrated ammeters may be connected in the circuits 5 and 20 because the applied voltage wave is substantially sine form. However, a crest voltmeter, of substantially the character set forth in the above indicated application, may be utilized for indicating the maximum value of the voltage impressed across the insulator 13.

The meters 11 and 18 may be connected as shown in broken lines in the drawings, and, if so connected and the reactor alone is varied, the meters may be calibrated directly in volts. However, if the insulators should break down while being tested, the condensers 10 and 17 would discharge through the meters and destroy them.

If the capacitance of the insulator 13 is sufficiently high, the condensers 10 and 17 may be omitted, and the resonant circuit will then comprise the reactors 9 and 16 and the insulators 13.

While I have shown my invention as particularly adaptable for testing insulators, it will be understood that it is not so limited and that various adaptations and modifications may be made therein without departing from the spirit and scope of the invention as set forth in the appended claims.

I claim as my invention:

1. A device for testing dielectrics comprising a source of electromotive force, a condenser and a reactor so connected thereto as to constitute a resonant circuit, and means for impressing the potential of a part of the resonant circuit upon the dielectric to be tested.

2. A high-voltage testing device comprising a source of relatively low electromotive force, a series-resonant circuit and means for so adjusting the constants of the circuit that a relatively high potential may be obtained across a part of the circuit.

3. A high-voltage testing device comprising a source of relatively low electromotive force, a condenser and a reactor so connected as to constitute a series-resonant circuit, means for determining the charging current of the condenser and means for connecting a device to be tested in parallel relation to the condenser.

4. A high-voltage testing device comprising a series resonant circuit, means for measuring the potential across a part of the circuit and means for connecting a device to be tested in parallel relation to that part of the circuit.

5. The method of testing dielectrics which consists in connecting the dielectric in parallel relation to a part of a resonant circuit and measuring the potential of that part of the resonant circuit.

6. The method of testing insulators and the like which consists in connecting the insulator in parallel relation to the condenser of a series-resonance circuit and adjusting the constants of the circuit until the correct potential is impressed across the insulator.

7. The method of testing which consists in connecting the device to be tested in parallel relation to one of the elements of a series-resonant circuit.

8. The method of testing which consists in forming a series-resonant circuit and connecting the device to be tested in parallel relation to the condensive element of the circuit.

9. The method of testing which consists in connecting the device to be tested in parallel relation to the condensive element of a series-resonant circuit and adjusting the constants of the circuit until the correct potential is impressed across the insulator.

10. The method of testing which consists in connecting the device to be tested in parallel relation to a part of a resonant circuit and measuring the potential of that part of the resonant circuit.

11. The method of testing which consists in connecting the device to be tested in parallel relation to a part of a series-resonant circuit and measuring the potential of that part of the resonant circuit.

12. The method of testing which consists in connecting the device to be tested to a part of a series-resonant circuit and measuring the potential of that part of the resonant circuit.

In testimony whereof, I have hereunto subscribed my name this 28th day of Jan., 1916.

LEWIS W. CHUBB.